United States Patent
Arur et al.

(10) Patent No.: US 12,470,472 B2
(45) Date of Patent: Nov. 11, 2025

(54) OPTIMIZED AGENT DEPLOYMENT FOR DATACENTER MONITORING

(71) Applicant: Cisco Technology, Inc., San Jose, CA (US)

(72) Inventors: Raghu Rajendra Arur, New Delhi (IN); Indermeet Singh Gandhi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/244,597

(22) Filed: Sep. 11, 2023

(65) Prior Publication Data
US 2025/0088448 A1   Mar. 13, 2025

(51) Int. Cl.
| | |
|---|---|
| H04L 12/703 | (2013.01) |
| H04L 12/707 | (2013.01) |
| H04L 12/717 | (2013.01) |
| H04L 12/741 | (2013.01) |
| H04L 29/06 | (2006.01) |
| H04L 29/12 | (2006.01) |
| H04L 43/065 | (2022.01) |
| H04L 43/0852 | (2022.01) |
| H04L 43/50 | (2022.01) |

(52) U.S. Cl.
CPC ............ *H04L 43/50* (2013.01); *H04L 43/065* (2013.01); *H04L 43/0852* (2013.01)

(58) Field of Classification Search
CPC .... H04L 43/50; H04L 43/065; H04L 43/0852
USPC ........................................... 709/224
See application file for complete search history.

(56) References Cited

U.S. PATENT DOCUMENTS

| | | | |
|---|---|---|---|
| 6,408,335 B1* | 6/2002 | Schwaller | H04L 43/50 709/224 |
| 8,995,301 B1* | 3/2015 | Miller | H04L 45/121 370/338 |
| 10,819,556 B1 | 10/2020 | Rangasamy et al. | |
| 11,271,775 B2 | 3/2022 | Skidmore et al. | |
| 11,444,871 B1* | 9/2022 | Nainar | H04L 63/0272 |
| 11,539,735 B2 | 12/2022 | Rao et al. | |
| 2007/0165532 A1* | 7/2007 | Retana | H04L 45/04 370/254 |

(Continued)

OTHER PUBLICATIONS

"NVIDIA Cumulus Linux—Network Reference Design Guide", 2022, 43 pages, NVIDIA Corporation.

*Primary Examiner* — Umar Cheema
*Assistant Examiner* — Golam Mahmud
(74) *Attorney, Agent, or Firm* — Lee & Hayes, P.C.; James M. Behmke

(57) ABSTRACT

In one implementation, a device determines a plurality of routes from one or more sources in a localized network domain to external addresses via a plurality of border leaf nodes of the localized network domain. The device selects, based on a specific performance test from a particular source of the one or more sources to a particular endpoint with a corresponding external address, a particular border leaf node of the plurality of border leaf nodes that is along a utilized route from the particular source to the particular endpoint based on the corresponding external address and the plurality of routes. The device causes the specific performance test to be executed from a particular testing agent installed on the particular border leaf node to the particular endpoint.

16 Claims, 6 Drawing Sheets

(56) References Cited

U.S. PATENT DOCUMENTS

| | | | |
|---|---|---|---|
| 2009/0268713 A1* | 10/2009 | Ottur | H04L 43/50 |
| | | | 370/352 |
| 2012/0027016 A1* | 2/2012 | Filsfils | H04L 45/30 |
| | | | 370/392 |
| 2013/0019005 A1* | 1/2013 | Hui | H04L 47/822 |
| | | | 709/224 |
| 2014/0222748 A1* | 8/2014 | Mermoud | H04L 41/16 |
| | | | 706/58 |
| 2016/0359695 A1 | 12/2016 | Yadav et al. | |
| 2017/0078176 A1* | 3/2017 | Lakshmikantha | H04L 43/0852 |
| 2017/0126647 A1* | 5/2017 | Zhang | H04L 63/123 |
| 2017/0329696 A1* | 11/2017 | Bitoun | G06F 11/3688 |
| 2018/0152861 A1 | 5/2018 | Rodriguez et al. | |
| 2018/0219899 A1* | 8/2018 | Joy | G06F 11/3433 |
| 2020/0106631 A1* | 4/2020 | Bosch | H04L 47/15 |
| 2020/0136973 A1* | 4/2020 | Rahman | H04L 45/745 |
| 2020/0379839 A1* | 12/2020 | Savalle | H04L 12/4633 |
| 2021/0288898 A1* | 9/2021 | Shen | H04L 43/0882 |
| 2022/0046045 A1* | 2/2022 | Rao | G06F 21/577 |
| 2022/0321457 A1* | 10/2022 | Hari | H04L 45/28 |

\* cited by examiner

OPTIMIZED AGENT DEPLOYMENT FOR DATACENTER MONITORING

TECHNICAL FIELD

The present disclosure relates generally to computer systems, and, more particularly, to optimized agent deployment for datacenter monitoring.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

Moreover, many current deployments of application performance monitoring agents on endpoints in data centers, such as servers and virtual machines (VMs), pose a challenge for network administrators. That is, while such agents provide valuable insights into network performance and help diagnose issues, their deployment on all servers and VMs is resource-intensive and wasteful of resources.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more implementations of the disclosure, optimized agent deployment for datacenter monitoring is shown and described. In particular, in one implementation, a device determines a plurality of routes from one or more sources in a localized network domain to external addresses via a plurality of border leaf nodes of the localized network domain. The device selects, based on a specific performance test from a particular source of the one or more sources to a particular endpoint with a corresponding external address, a particular border leaf node of the plurality of border leaf nodes that is along a utilized route from the particular source to the particular endpoint based on the corresponding external address and the plurality of routes. The device causes the specific performance test to be executed from a particular testing agent installed on the particular border leaf node to the particular endpoint.

Other implementations are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
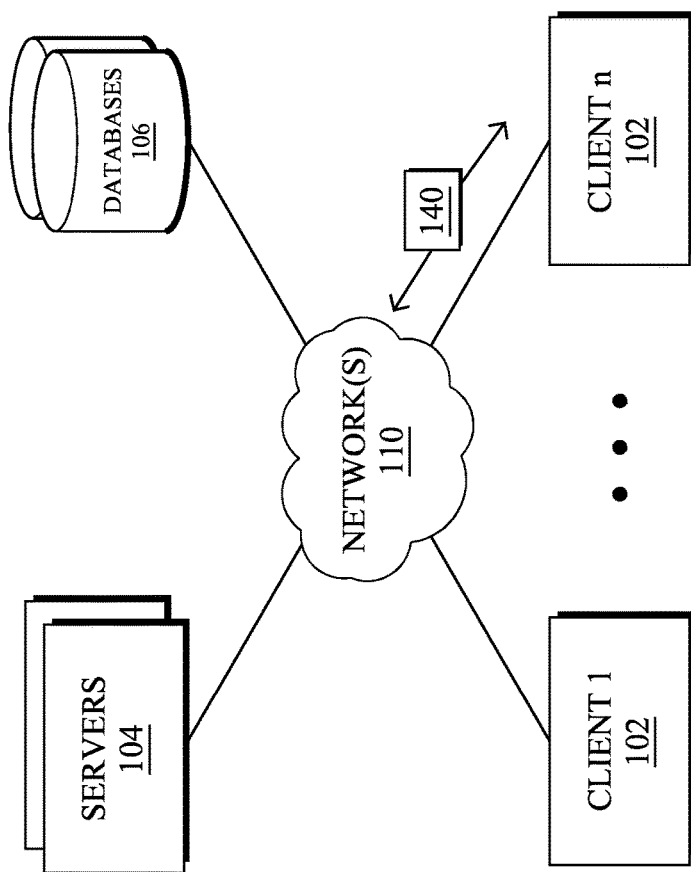
FIG. 1 illustrates an example computer network.

FIG. 1 is a schematic block diagram of a simplified example of a computing system 100 that illustratively comprises client devices 102 (e.g., a first through nth client device, any number of client devices), one or more servers 104, and one or more databases 106, where the devices may be in communication with one another via network(s) 110 (e.g., any number of networks). The network(s) 110 may include, as would be appreciated, any number of specialized networking devices such as routers, switches, access points, etc., interconnected via wired and/or wireless connections. For example, the devices and/or the intermediary devices in network(s) 110 may communicate wirelessly via links based on WiFi, cellular, infrared, radio, near-field communication, satellite, or the like. Other such connections may use hard-wired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, servers and/or databases, including any number of other suitable devices (e.g., firewalls, gateways, and so on) may be part of a cloud-based service. In such cases, the servers and/or databases may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
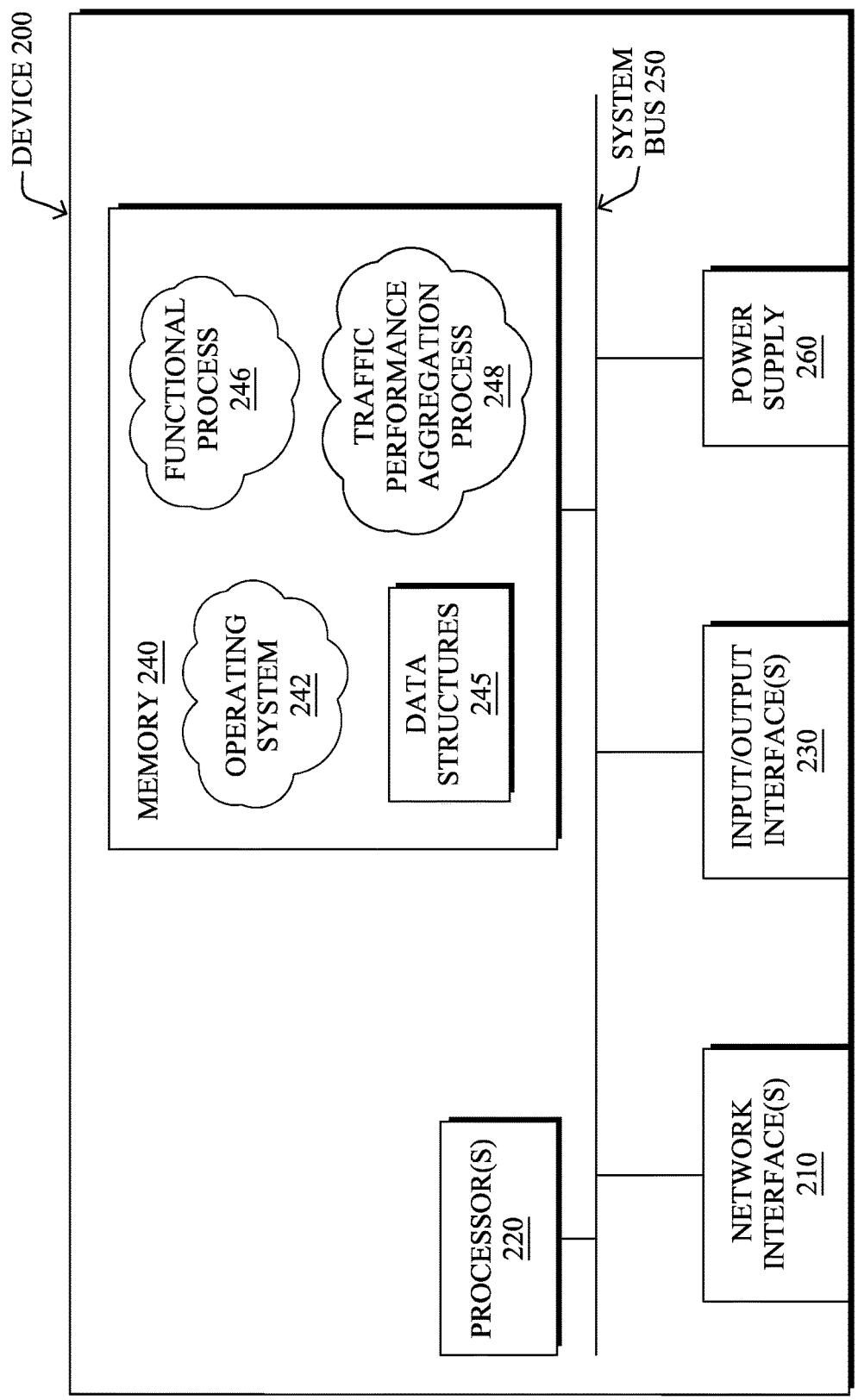
FIG. 2 illustrates an example computing device/node.

FIG. 2 is a schematic block diagram of an example node/device 200 that may be used with one or more implementations described herein, e.g., as any of the client devices 102-106 shown in FIG. 1 above. Device 200 may comprise one or more network interfaces 210 (e.g., wired, wireless, etc.), a processor 220 (or processors), and a memory 240 interconnected by a system bus 250, as well as a power supply 260 (e.g., battery, plug-in, etc.).

The one or more network interfaces 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via one or more network interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the one or more network interfaces 210 for storing software programs and data structures associated with the implementations described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, illustratively a traffic performance aggregation process 248, as described herein. Notably, the one or more functional processes 246, when executed by processor 220 (or processors), cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Observability Intelligence Platform

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT)

operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more implementations herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable implementation of categorical classification.

Figure 3:
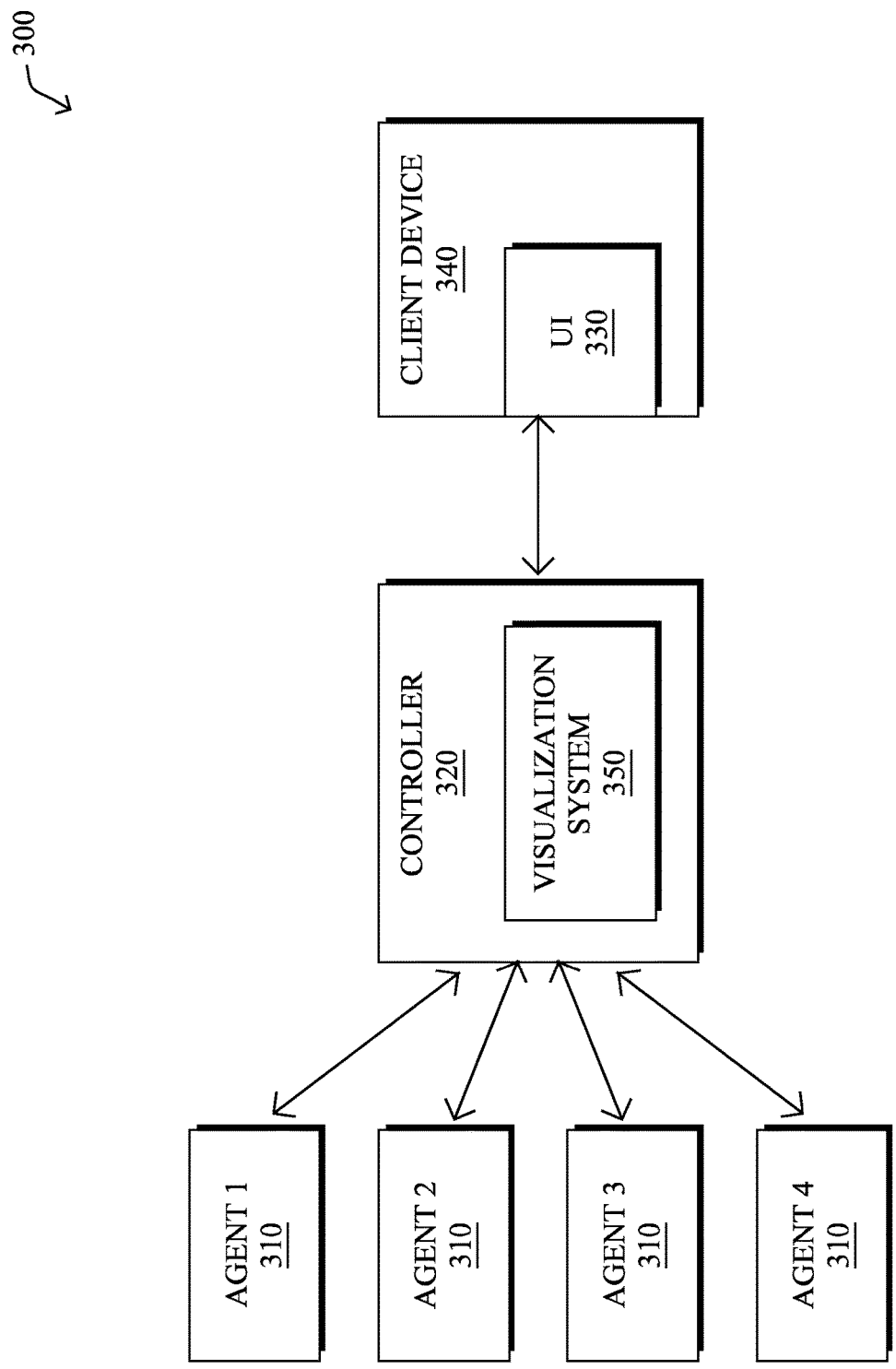
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controllers 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller 320 (or controllers) as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a browser-based user interface, UI 330 that is the primary interface for monitoring, analyzing, and troubleshooting the monitored environment. Specifically, the controller 320 can receive data from one or more agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the UI 330. The UI 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of controller 320 may be hosted remotely by a provider of the observability intelligence platform 300. In an illustrative on-premises (On-Prem) implementation, an instance of controller 320 may be installed locally and self-administered.

The controller 320 (or controllers) receives data from different agents of the one or more agents 310 (e.g., Agents 1-4) deployed to monitor networks, applications, databases and database servers, servers, and end user clients for the monitored environment. Any of the one or more agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain implementations, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one implementation, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain implementations, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

Optimized Agent Deployment for Datacenter Monitoring

While observability intelligence platforms, also referred to herein as application performance monitoring (APM) platforms, provide valuable insights into network performance and help diagnose issues, optimizations may still be made in their configurations. For instance, as noted above, many current deployments of application performance monitoring agents on endpoints in data centers, such as servers and virtual machines (VMs), pose a challenge for network administrators, where their deployment on all servers and VMs is resource-intensive and wasteful of resources.

Moreover, application performance monitoring agents are mostly used to test the performance of north-south traffic in a datacenter. In a datacenter the north-south traffic egresses from a set of border nodes that connect the fabric to the internet. Other nodes are not externally connected and are used for intra fabric communication. As all north-south traffic flows through a smaller set of border leaf deploying application performance monitoring agents on all servers and VMs is not optimal.

Today the test results are correlated with the end-point on which the tests are run. As such, application performance monitoring agents are deployed only on the border leaf, an application performance monitoring controller will associate the test results with the border leaf. But what is needed is visibility into network performance from the standpoint of servers and VMs.

The techniques herein, therefore, provide a method of deploying application performance monitoring agents on border leafs without compromising or losing out on the visibility of network performance from the standpoint of a server or VM. These techniques vastly decrease the cost of running the agents and also save energy for running these agents.

Specifically, according to one or more implementations described herein, a process (e.g., a traffic performance aggregator) determines a plurality of routes from one or more sources in a localized network domain to external addresses via a plurality of border leaf nodes of the localized network domain. Then, based on a specific performance test from a particular source of the one or more sources to a particular endpoint with a corresponding external address, the process determines a particular border leaf node of the plurality of border leaf nodes that is along a utilized route from the particular source to the particular endpoint based on the corresponding external address and the plurality of routes. As such, the process may then cause the specific performance test to be executed from a particular testing agent installed on the particular border leaf node to the particular endpoint.

Figure 4:
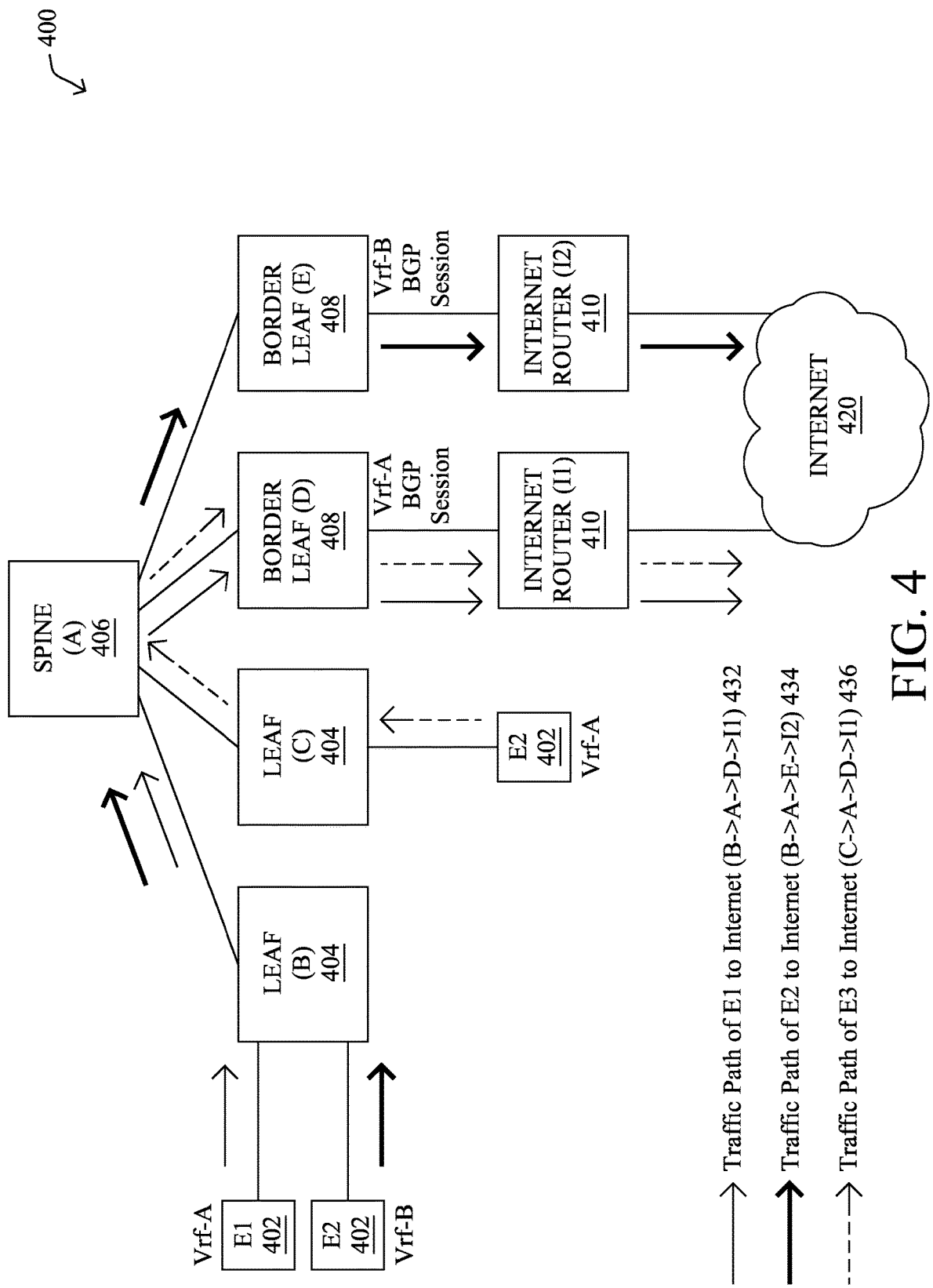
FIG. 4 illustrates an example datacenter architecture.

Operationally, the techniques herein leverage datacenter connectivity to optimize agent placement. FIG. 4 illustrates an example datacenter architecture 400 (e.g., a fabric) with leafs, spines and border leafs. The hosts (servers and VMs) are endpoints 402, such as E1, E2, and E3, connected to the leaf nodes 404, such as E1 and E2 connected to Leaf (B) and E3 connected to Leaf (C). The leaf nodes 404 connect to the Spine 406 (e.g., Spine (A)). Border leaf nodes 408, such as Border Leaf (D) and Border Leaf (E) connect to the Internet 420 via Internet Routers 410 (e.g., Border Leaf (D) connected to Internet Router (I1) and Border Leaf (E) connected to Internet Router (I2)).

In this configuration, any north-south traffic in the datacenter flows from a corresponding ingress leaf (the leaf to which the endpoints are connected) goes to the Spine (spine acts as an aggregator) and from the spine it goes to the appropriate border leaf that is connected to the external router.

In FIG. 4, there are illustratively three endpoints (e.g., servers or VMs). E1 and E2 are connected to Leaf (B) using Virtual Routing and Forwarding (VRF) tables VRF-A and VRF-B, respectively, and E3 is connected to Leaf (C) over VRF-B. The path from a server/VM to the internet depends on the VRF that the interface is configured with, and the VRF determines the border leaf node through which the traffic exits to the internet 420. As shown, the traffic paths illustratively are as follows in this simplified datacenter architecture:

E1 Traffic Path 432 to Internet: E1→(B)→(A)→(D)→(I1);

E2 Traffic Path 434 to Internet: E2→(B)→(A)→(D)→(I2); and

E3 Traffic Path 436 to Internet: E3→(C)→(A)→(D)→(I1).

Notably, the intra-fabric latencies are in micro-seconds and generally the pipes within the datacenter are over-provisioned and impact of fabric on the network performance between the endpoint to the service endpoint in the internet is negligible. This effectively implies that it is overkill to run agents on servers and VMs in a data center. Running the agents only on border leafs is generally considered sufficient enough to obtain the network performance of each server/VM in the datacenter to the internet.

According to the techniques herein, application performance monitoring agents, or "performance testing agents" herein, are deployed on border leaf nodes as an optimization for costs and energy. In particular, instead of installing the agents on the servers and VMs in the datacenter, as is done conventionally, the techniques herein install the agents only on the border leafs (switches that connect to the external network). That is, the union of tests that are required to be configured across all the sources (servers and VMs) is configured on the agents that are installed on the border leafs. These tests give the network performance of the communication between the border-leaf and internet (service endpoints). In a datacenter there will be thousands of endpoints (servers and VMs), but the number of border leaf nodes would be a much smaller number (e.g., about ten). The techniques herein thus leads to a 100× reduction in the number of agents and tests being run.

Figure 5:
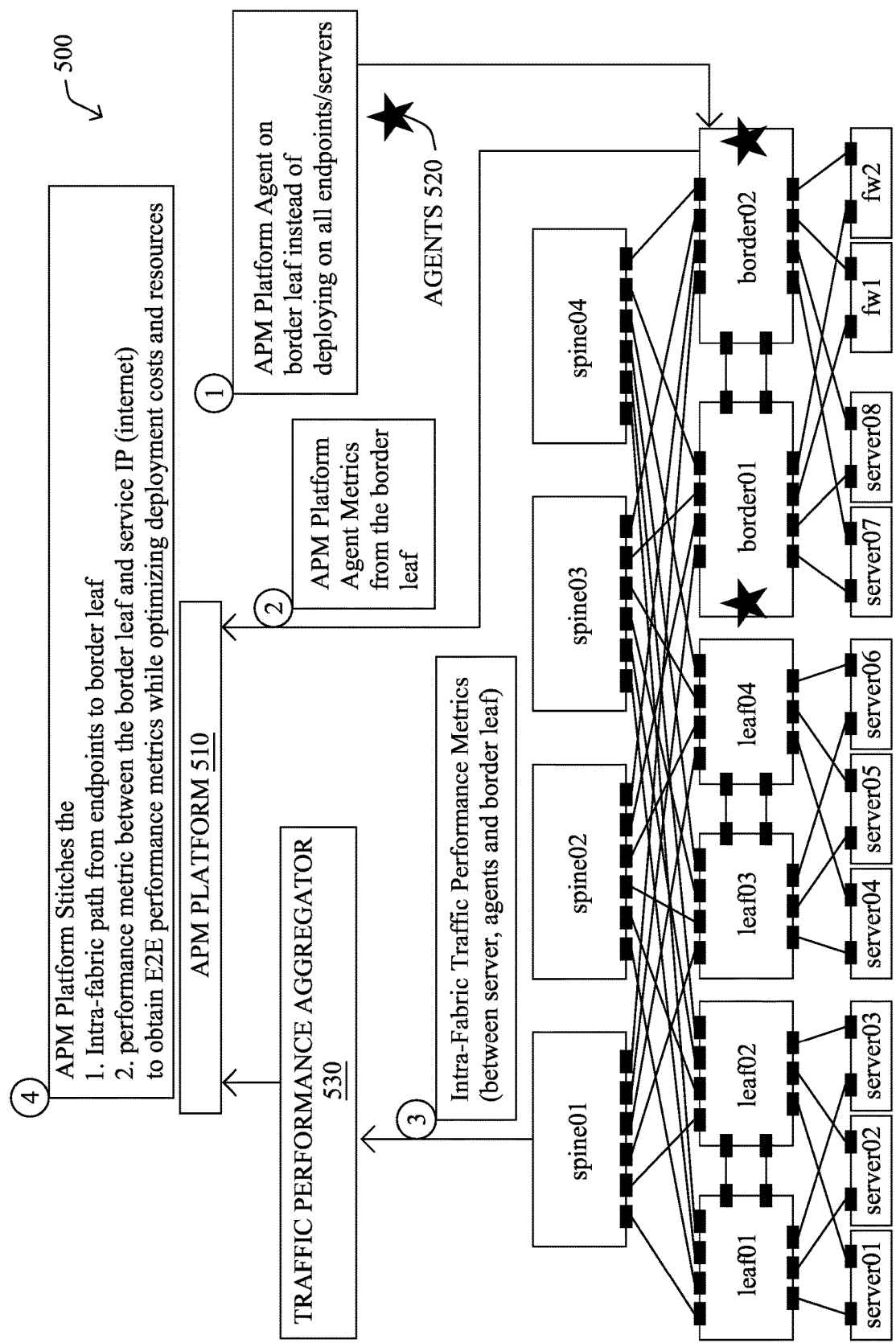
FIG. 5 illustrates an example of optimized agent deployment for datacenter monitoring in accordance with one or more implementations described herein.

With reference now to FIG. 5 showing a system 500 of optimized agent deployment for datacenter monitoring in accordance with one or more implementations described herein, the techniques herein may now glean datacenter fabric information for correlation. For example, an illustrative datacenter fabric is shown generally with splines (01-04), leafs (01-04), border lead nodes (01-02) servers (01-08), and forwarders (fw1 and fw2), with numerous respective interconnections as shown and as may be appreciated by those skilled in the art.

In particular, regarding the gleaning of datacenter fabric information for correlation, in addition to the application performance monitoring platform (APM platform 510) and agents 520, the techniques herein introduce a traffic performance aggregator 530 (e.g., a module), which gleans the following information to enhance the test results run on the border-leaf to be correlated to individual endpoints:

It collects the inventory of the VMs and servers (fabric endpoints) that are learned by the fabric including the IP-addresses and VRFs on which they are communicate. Every network interface connected to the server/VM might take a different path in the network based on the VRF that is attached to.

It collects the external routes that are learned by each border switch/leaf per VRF.

It extracts the contract information (e.g., ACL policy rules) that determines how the servers/VMs are talking to the external network.

It pulls the traffic analytics like latency, buffer drops, jitter, etc. provided by tools for intra-fabric traffic performance (e.g., Nexus Insights available from Cisco Systems, Inc.).

The above information may thus be extracted by the Traffic Performance Aggregator from the datacenter fabric using rest APIs or by subscribing for notifications from the controller (e.g., within APM platform 510). That is, when a new VM is added, a configuration changes, or a new route is added, these changes get streamed to the Traffic Performance Aggregator module.

According to the techniques herein, application performance monitoring test results may now be extended to each endpoint. Specifically, application performance monitoring agents and tests are generally associated 1:1. As such, as tests are running on the border leaf nodes, there needs to be a way to associate the test results with the endpoints. Accordingly, the traffic performance aggregator 530 this provides an interface to the application performance monitoring controller (of APM platform 510) where the user or other process inputs a source IP (e.g., a server/VM IP in the datacenter) and the destination service endpoint (the service in the internet). The application performance monitoring controller queries the Traffic Performance Aggregator for the appropriate border leaf node given the source and the destination IP addresses. Since the traffic performance aggregator has the inventory of the addresses (IPs) of all the servers/VMs, their VRFs, the route table for each of the VRFs, and the BGP sessions running on the border leaf, then by using the learned routes and the source IP, the Traffic Performance Aggregator can easily find the border leaf node through which the traffic would exit the datacenter. The application performance monitoring controller then correlates the test results that were run by the agent on the border leaf node to the server/VM of interest.

As mentioned above, the intra-fabric latency and jitter are almost negligible. However, if that needs to be incorporated into the test results, then the traffic flow statistics, characteristics, metrics, etc., can be exported out of observability tools (e.g., Nexus Insights) to enhance the results.

Figure 6:
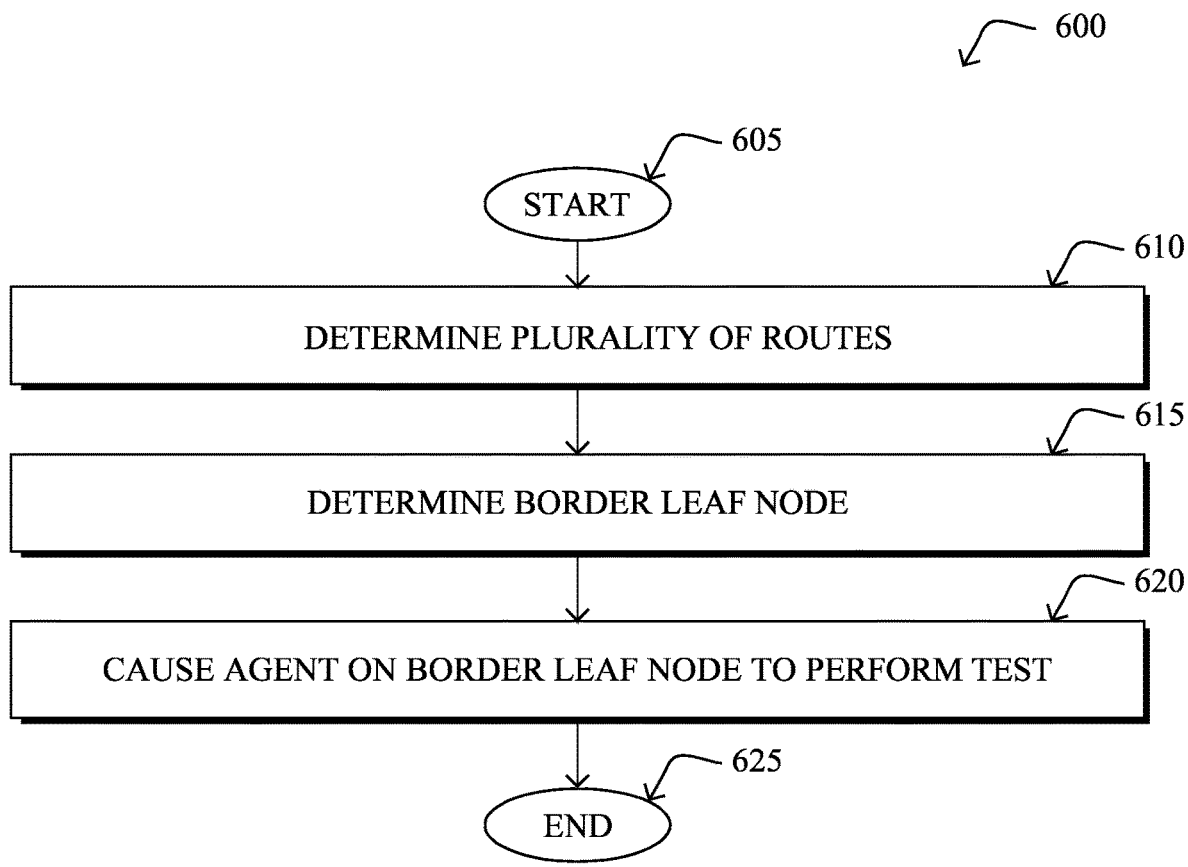
FIG. 6 illustrates an example simplified procedure for optimized agent deployment for datacenter monitoring in accordance with one or more implementations described herein.

In closing, FIG. 6 illustrates an example simplified procedure for optimized agent deployment for datacenter monitoring in accordance with one or more implementations described herein. For example, a non-generic, specifically configured device (e.g., device 200, such as a traffic performance aggregator or other apparatus) may perform procedure 600 (e.g., a method) by executing stored instructions (e.g., traffic performance aggregation process 248). The procedure 600 may start at step 605, and continues to step 610, where, as described in greater detail above, the techniques herein determine a plurality of routes from one or more sources (e.g., servers, VMs, etc.) in a localized network domain (e.g., a datacenter) to external addresses via a plurality of border leaf nodes of the localized network domain. For example, as described above, determining the plurality of routes may be based on VRF tables within the localized network domain and BGP sessions of the plurality of border leaf nodes, as well as ACLs, etc.

In step 615, the techniques may then select, based on a specific performance test from a particular source of the one or more sources to a particular endpoint with a corresponding external address, a particular border leaf node of the plurality of border leaf nodes that is along a utilized route from the particular source to the particular endpoint based on the corresponding external address and the plurality of routes.

Accordingly, in step 620, the techniques herein may then cause the specific performance test to be executed from a particular testing agent installed on the particular border leaf node to the particular endpoint. As noted above, the specific performance test may be configured to deem performance metrics of the localized network domain negligible, or else to include performance metrics of the localized network domain. In the latter instance, the techniques herein may thus stitch the performance metrics of the localized network domain (e.g., latency, buffer drops, jitter, etc.) from the particular source to the particular border leaf node to results of the specific performance test from the particular testing agent installed on the particular border leaf node to the particular endpoint. Note also that, as mentioned above, the performance metrics of the localized network domain may be based on participation by the particular testing agent and/or an application performance monitoring platform, or else may be based on network monitoring unrelated to the particular testing agent.

The procedure 600 may then end in step 625, notably with the ability to continue updating routes, assisting controllers with testing, and so on. Other steps may also be included generally within procedure 600. For example, such steps (or, more generally, such additions to steps already specifically illustrated above), may include: receiving requests to initiate the specific performance test from a network performance testing agent controller; informing network performance testing agent controllers of the particular border leaf node that is along the utilized route from the particular source to the particular endpoint; and so on. Moreover, where the particular endpoint comprises a service with a plurality of corresponding external addresses, the techniques herein may determine a plurality of particular border leaf nodes that are along a plurality of utilized routes from the particular source to the particular endpoint based on the plurality of corresponding external addresses and the plurality of routes, to therefore cause the specific performance test to be executed from a plurality of particular testing agents installed respectively on the plurality of particular border leaf nodes, accordingly.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

The techniques described herein, therefore, provide for optimized agent deployment for datacenter monitoring. In particular, based on the techniques herein, in a datacenter scenario, there is no need to run the agents on the end-points in the datacenter, and the agents may only be configured on the border leafs. This leads to vast reduction in the number of agents and tests run (e.g., by a factor of a hundred by today's typically sized data centers), where the union of all the tests that were supposed to be run on the servers is configured to run on all the border leafs. However, unlike previous methodology that falls short of full-picture performance monitoring by merely associating the tests with the agents, the techniques herein properly correlate the agent results with the endpoints learned in the datacenter fabric.

In still further implementations of the techniques herein, a business impact of the aggregated performance metrics can also be quantified. That is, because of issues related to specific applications/processes (e.g., lost traffic, slower servers, overloaded network links, etc.), various corresponding business transactions may have been correspondingly affected for those applications/processes (e.g., online purchases were delayed, page visits were halted before fully loading, user satisfaction or dwell time decreased, etc.), while other processes (e.g., on other network segments or at other times) remain unaffected. The techniques herein, therefore, can correlate the aggregated performance metrics with various business transactions in order to better understand the effect on the business transactions, accordingly.

Illustratively, the techniques described herein may be performed by hardware, software, and/or firmware, such as in accordance with the traffic performance aggregation process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the traffic performance aggregation process 248.

According to the implementations herein, an illustrative method herein may comprise: determining, by a device, a plurality of routes from one or more sources in a localized network domain to external addresses via a plurality of border leaf nodes of the localized network domain; selecting, by the device and based on a specific performance test from a particular source of the one or more sources to a particular endpoint with a corresponding external address, a particular border leaf node of the plurality of border leaf nodes that is along a utilized route from the particular source to the particular endpoint based on the corresponding external address and the plurality of routes; and causing, by the device, the specific performance test to be executed from a particular testing agent installed on the particular border leaf node to the particular endpoint.

In one implementation, the method further comprises: receiving a request to initiate the specific performance test from a network performance testing agent controller, wherein causing comprises informing the network performance testing agent controller of the particular border leaf node that is along the utilized route from the particular source to the particular endpoint.

In one implementation, the specific performance test is configured to deem performance metrics of the localized network domain negligible.

In one implementation, the specific performance test is configured to include performance metrics of the localized network domain. In one implementation, the specific performance test stitches the performance metrics of the localized network domain from the particular source to the particular border leaf node to results of the specific performance test from the particular testing agent installed on the particular border leaf node to the particular endpoint. In one implementation, the performance metrics of the localized network domain comprise one or more of latency, buffer drops, or jitter. In one implementation, the performance metrics of the localized network domain are based on network monitoring unrelated to the particular testing agent.

In one implementation, the localized network domain comprises a datacenter.

In one implementation, the one or more sources comprise one or more of servers or virtual machines.

In one implementation, determining the plurality of routes is based on virtual routing and forwarding tables within the localized network domain and border gateway protocol sessions of the plurality of border leaf nodes.

In one implementation, determining the plurality of routes is based on one or more access control lists.

In one implementation, the device comprises a traffic performance aggregator.

In one implementation, the particular endpoint comprises a service with one or more corresponding external addresses. In one implementation, the service is associated with a plurality of corresponding external addresses, and the method further comprises: determining a plurality of particular border leaf nodes that are along a plurality of utilized routes from the particular source to the particular endpoint based on the plurality of corresponding external addresses and the plurality of routes; and causing the specific performance test to be executed from a plurality of particular testing agents installed respectively on the plurality of particular border leaf nodes.

According to the implementations herein, an illustrative tangible, non-transitory, computer-readable medium having computer-executable instructions stored thereon that, when executed by a processor on a computer, cause the computer to perform a method comprising: determining a plurality of routes from one or more sources in a localized network domain to external addresses via a plurality of border leaf nodes of the localized network domain; selecting, based on a specific performance test from a particular source of the one or more sources to a particular endpoint with a corresponding external address, a particular border leaf node of the plurality of border leaf nodes that is along a utilized route from the particular source to the particular endpoint based on the corresponding external address and the plurality of routes; and causing the specific performance test to be executed from a particular testing agent installed on the particular border leaf node to the particular endpoint.

Further, according to the implementations herein an illustrative apparatus herein may comprise: one or more network interfaces to communicate with a network; a processor coupled to the one or more network interfaces and configured to execute one or more processes; and a memory configured to store a process that is executable by the processor, the process, when executed, configured to: determine a plurality of routes from one or more sources in a localized network domain to external addresses via a plurality of border leaf nodes of the localized network domain; selecting, based on a specific performance test from a particular source of the one or more sources to a particular endpoint with a corresponding external address, a particular border leaf node of the plurality of border leaf nodes that is along a utilized route from the particular source to the particular endpoint based on the corresponding external address and the plurality of routes; and cause the specific performance test to be executed from a particular testing agent installed on the particular border leaf node to the particular endpoint.

While there have been shown and described illustrative implementations above, it is to be understood that various other adaptations and modifications may be made within the scope of the implementations herein. For example, while certain implementations are described herein with respect to certain types of networks in particular, the techniques are not limited as such and may be used with any computer network, generally, in other implementations. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the implementations have been shown and described herein with relation to specific network configurations (orientations, topologies, protocols, terminology, processing locations, etc.). However, the implementations in their broader sense are not as limited, and may, in fact, be used with other types of networks, protocols, and configurations.

Moreover, while the present disclosure contains many other specifics, these should not be construed as limitations on the scope of any implementation or of what may be claimed, but rather as descriptions of features that may be specific to particular implementations. Certain features that are described in this document in the context of separate implementations can also be implemented in combination in a single implementation. Conversely, various features that are described in the context of a single implementation can also be implemented in multiple implementations separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a collection engine", those skilled in the art will appreciate that agents of the observability intelligence platform (e.g., application agents, network agents, language agents, etc.) may be considered to be extensions of another device's operation (e.g., server, or controller/engine, etc.), and as such, any process step performed by a particular kind of device need not be limited to local processing on a specific device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true intent and scope of the implementations herein.

What is claimed is:

1. A method, comprising:
    determining, by a device, a plurality of routes from one or more sources in a localized network domain to external addresses via a plurality of border leaf nodes of the localized network domain, wherein each of the plurality of border leaf nodes connects the localized network domain to an external network;
    selecting, by the device and based on a specific performance test from a particular source of the one or more sources to a particular endpoint with a corresponding external address, a particular border leaf node of the plurality of border leaf nodes that is along a utilized route from the particular source to the particular endpoint based on the corresponding external address and the plurality of routes;
    causing, by the device, the specific performance test to be executed from a particular testing agent installed on the particular border leaf node to the particular endpoint;
    stitching, by the device and into end-to-end path metrics, performance metrics of the localized network domain from the particular source to the particular border leaf node to results of the specific performance test from the particular testing agent installed on the particular border leaf node to the particular endpoint; and correlating, by the device, the end-to-end path metrics to the particular source as a result of the specific performance test from the particular source to the particular endpoint.

2. The method as in claim 1, further comprising:
receiving a request to initiate the specific performance test from a network performance testing agent controller, wherein causing comprises informing the network performance testing agent controller of the particular border leaf node that is along the utilized route from the particular source to the particular endpoint.

3. The method as in claim 1, wherein the specific performance test is configured to deem the performance metrics of the localized network domain negligible.

4. The method as in claim 1, wherein the performance metrics of the localized network domain comprise one or more of latency, buffer drops, or jitter.

5. The method as in claim 1, wherein the performance metrics of the localized network domain are based on network monitoring unrelated to the particular testing agent.

6. The method as in claim 1, wherein the localized network domain comprises a datacenter.

7. The method as in claim 1, wherein the one or more sources comprise one or more of servers or virtual machines.

8. The method as in claim 1, wherein determining the plurality of routes is based on virtual routing and forwarding tables within the localized network domain and border gateway protocol sessions of the plurality of border leaf nodes.

9. The method as in claim 1, determining the plurality of routes is based on one or more access control lists.

10. The method as in claim 1, wherein the device comprises a traffic performance aggregator.

11. The method as in claim 1, wherein the particular endpoint comprises a service with one or more corresponding external addresses.

12. The method as in claim 11, wherein the service is associated with a plurality of corresponding external addresses, the method further comprising:
selecting a plurality of particular border leaf nodes that are along a plurality of utilized routes from the particular source to the particular endpoint based on the plurality of corresponding external addresses and the plurality of routes; and
causing the specific performance test to be executed from a plurality of particular testing agents installed respectively on the plurality of particular border leaf nodes.

13. A tangible, non-transitory, computer-readable medium having computer-executable instructions stored thereon that, when executed by a processor on a computer, cause the computer to perform a method comprising:
determining a plurality of routes from one or more sources in a localized network domain to external addresses via a plurality of border leaf nodes of the localized network domain, wherein each of the plurality of border leaf nodes connect the localized network domain to an external network;
selecting, based on a specific performance test from a particular source of the one or more sources to a particular endpoint with a corresponding external address, a particular border leaf node of the plurality of border leaf nodes that is along a utilized route from the particular source to the particular endpoint based on the corresponding external address and the plurality of routes;
causing the specific performance test to be executed from a particular testing agent installed on the particular border leaf node to the particular endpoint;
stitching, into end-to-end path metrics, performance metrics of the localized network domain from the particular source to the particular border leaf node to results of the specific performance test from the particular testing agent installed on the particular border leaf node to the particular endpoint; and
correlating the end-to-end path metrics to the particular source as a result of the specific performance test from the particular source to the particular endpoint.

14. The tangible, non-transitory, computer-readable medium as in claim 13, wherein the method further comprises:
receiving a request to initiate the specific performance test from a network performance testing agent controller, wherein causing comprises informing the network performance testing agent controller of the particular border leaf node that is along the utilized route from the particular source to the particular endpoint.

15. The tangible, non-transitory, computer-readable medium as in claim 13, wherein the specific performance test is configured to deem the performance metrics of the localized network domain negligible.

16. An apparatus, comprising:
one or more network interfaces to communicate with a network;
a processor coupled to the one or more network interfaces and configured to execute one or more processes; and
a memory configured to store a process that is executable by the processor, the process, when executed, configured to:
determine a plurality of routes from one or more sources in a localized network domain to external addresses via a plurality of border leaf nodes of the localized network domain, wherein each of the plurality of border leaf nodes connects the localized network domain to an external network;
select, based on a specific performance test from a particular source of the one or more sources to a particular endpoint with a corresponding external address, a particular border leaf node of the plurality of border leaf nodes that is along a utilized route from the particular source to the particular endpoint based on the corresponding external address and the plurality of routes;
cause the specific performance test to be executed from a particular testing agent installed on the particular border leaf node to the particular endpoint;
stitch, into end-to-end path metrics, performance metrics of the localized network domain from the particular source to the particular border leaf node to results of the specific performance test from the particular testing agent installed on the particular border leaf node to the particular endpoint; and
correlate the end-to-end path metrics to the particular source as a result of the specific performance test from the particular source to the particular endpoint.

* * * * *